(12) United States Patent
Mukai

(10) Patent No.: US 7,270,897 B2
(45) Date of Patent: Sep. 18, 2007

(54) MAGNETIC RECORDING MEDIUM, METHOD OF MANUFACTURING THE SAME MEDIUM AND MAGNETIC DISC DRIVE

(75) Inventor: Ryoichi Mukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/008,713

(22) Filed: Dec. 7, 2001

(65) Prior Publication Data

US 2002/0045071 A1    Apr. 18, 2002

Related U.S. Application Data

(63) Continuation of application No. PCT/JP99/03174, filed on Jun. 14, 1999.

(51) Int. Cl.
*G11B 5/66* (2006.01)
*G11B 5/70* (2006.01)

(52) U.S. Cl. ............... 428/836.1; 204/192.2; 427/130

(58) Field of Classification Search ........... 428/694 JS, 428/694 TP, 900, 836.1; 427/128, 130, 131; 204/192.15, 192.2; 360/135; 369/288
See application file for complete search history.

(56) References Cited

U.S. PATENT DOCUMENTS 4,774,130 A * 9/1988 Endo et al. ................. 428/216
5,759,617 A * 6/1998 Mukai ........................ 427/130
5,840,394 A * 11/1998 Ranjan et al. .............. 428/829
5,939,202 A * 8/1999 Ataka et al. ................ 428/457
5,989,728 A * 11/1999 Coffey et al. ............... 428/611
6,139,981 A * 10/2000 Chuang et al. ............. 428/831
6,153,284 A * 11/2000 Gui et al. ................... 428/141
6,268,036 B1 * 7/2001 Marinero et al. .......... 428/65.3

FOREIGN PATENT DOCUMENTS

| JP | 64-79919 | * | 3/1989 |
| JP | 6479919 | | 3/1989 |
| JP | 05101933 A | * | 4/1993 |
| JP | 8-329464 | * | 12/1996 |
| JP | 08329464 | | 12/1996 |

* cited by examiner

*Primary Examiner*—Holly Rickman
(74) *Attorney, Agent, or Firm*—Greer, Burns & Crain, Ltd.

(57) ABSTRACT

A higher value of an anistropic magnetic feild can be acquired by using a magnetic material where Cr is not added as a material of a magnetic layer on which magnetic data is recorded. A magnetic recording medium can be manufactured through the processes of laminating an underlayer cosisting opf Cr-based non-magnetic material on a substrate, and then laminating, on this underlayer, a magnetic layer consisting of an alloy of at least one kind of non-magnetic material that is different from Cr and Co.

2 Claims, 13 Drawing Sheets

POST-ANNEALING TEMPERATURE (°C)

MAGNETIC RECORDING MEDIUM, METHOD OF MANUFACTURING THE SAME MEDIUM AND MAGNETIC DISC DRIVE

This is a continuation of International PCT Application No. JP99/03174 filed Jun. 14, 1999, which was not published in English.

BACKGROUND OF THE INVENTION

1. Field of the Invention

The present invention relates to a magnetic recording medium applied to a hard disc drive and a method of manufacturing the same medium.

In recent years, reduction in size and enlargement of capacity are essential requirements for a hard disc drive which plays the concentrated role of an information storage apparatus. These requirements can be realized by enhancing the recording density of a magnetic disc medium. In order to increase the recording density, it is requested to realize reduction in thickness of a magnetic film, improvement in resolution, high coercive force and low noise.

2. Description of the Related Art

As the recording density of a magnetic disc medium becomes high, an area of one bit on the medium is reduced. In such background, it is required, for acquisition of an output, to make the magnetic layer thinner corresponding to a reduction in the size of a bit. Thereby, a semi-circular magnetic field can be assured and thereby leakage magnetic field generated from the magnetization area of one bit can be obtained. Moreover, since it is also required to narrow the bit interval, improvement in the magnetic domain structure in the magnetization transition area, scale-down of crystal grain corresponding to reduction in thickness and noise reduction by reduction in magnetic mutual operations among the particles or the like are necessary.

As a magnetic layer of a medium, a CoCr group alloy polycrystalline film formed of three or more elements has been used as a material of the magnetic layer. In the existing medium, Cr included in the magnetic grains of a magnetic layer is segregated into the crystal grain boundary and this grain boundary is non-magnetized to reduce mutual operation among the particles. In the related art, in order to promote this segregation, adding coefficient of Cr to alloy is increased, Ta or the like is added and a substrate is also heated during the film forming process.

As explained above, while a means for segregating Cr included in the magnetic grains into the crystal grain boundary and non-magnetizing this grain boundary region is introduced, it is essential to use the CoCr group alloy magnetic material as a material of the magnetic layer. However, when reduction in thickness of magnetic layer and scale-down of crystal grains are promoted, a volume of individual magnetic grains is reduced, thermal disturbance is finally generated to result in the super-normal magnetization and the magnetic recording condition can no longer be maintained. In order to reduce the volume of individual magnetic grains as much as possible to a small amount, it is best to use a magnetic material having a higher anisotropic constant Ku. In the Co-based magnetic material, a value of Ku is lowered by as much as about one digit by adding Cr to the discrete element of Co. Therefore, use of the CoCr group alloy will make it very difficult to maintain the value of Ku. Moreover, the discrete element of Co will bring about a problem that corrosion proof characteristic is deteriorated.

An object of the present invention is to provide a magnetic recording medium having higher recording density. Moreover, another object of the present invention is to realize a reduction in thickness of a magnetic film of a magnetic recording medium. Moreover, the other object of the present invention is to reduce noise of the magnetic recording medium itself.

In the present invention, unlike the CoCr group alloy used as a material of a magnetic layer, a Co-based alloy, where a non-magnetic element different from Cr is added to the Co discrete element, is used as a material of the magnetic layer. According to the present invention, reduction of the value of Ku due to the formation of alloy is controlled, and thereby a problem in reduction of thickness of magnetic layer in a magnetic recording medium can be solved.

However, when a Co-based alloy not including Cr is used as a material of the magnetic layer, Cr included in the magnetic grains is segregated into the crystal grain boundary and the grain boundary region can no longer be non-magnetized. Therefore, in the present invention, a Cr-based non-magnetic material is used as an underlayer. According to the present invention, the grain boundary region can be non-magnetized by segregating Cr to the crystal grain boundary from the underlayer. In practice, diffusion of Cr into the crystal grain boundary of the magnetic layer from the underlayer is induced with post-annealing. As a result, the magnetic layer has a structure in which Cr exists only at the area near the crystal grain boundary, and thereby non-magnetization of the grain boundary region of the magnetic layer can be realized. Since the grain boundary region of the magnetic layer is non-magnetized, magnetic mutual operation among the grains can be reduced, and noise of magnetic recording medium can also be reduced.

DESCRIPTION OF THE PREFERRED EMBODIMENT

Figure 1:
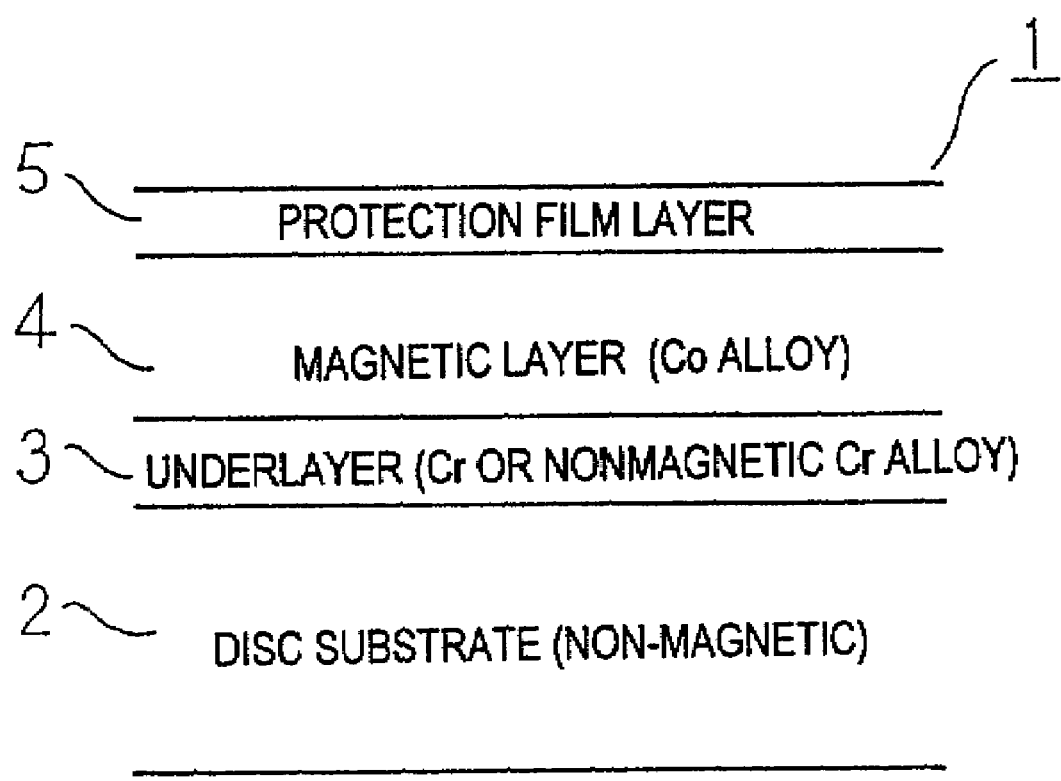
FIG. 1 is a cross-sectional view of a disc medium of the present invention.

FIG. 1 is a cross-sectional view of a magnetic recording medium of the present invention. In the magnetic recording medium 1 of the present invention, an underlayer 3, a magnetic layer 4, and a protection layer 5 are sequentially formed on a substrate 2. Each film forming the magnetic recording medium 1 will be explained below.

The substrate 2 is formed of a non-magnetic material of a disc shape. A material forming the substrate 2 includes an NiP plated aluminum (including aluminum alloy) disc, a glass (including reinforced glass) disc, a silicon disc having a surface oxide film, an SiC disc, a carbon disc, a plastic disc, a ceramic disc or the like. Moreover, the substrate 2 is not always required to have completed the texture process. The size of substrate 2 is determined depending on the kind of desired medium and magnetic disc drive as the application object or the like. In general, the external diameter is in the range of 65 mm to 95 mm, the internal diameter is in the range of 20 mm to 25 mm and the thickness is in the range of 0.635 mm to 0.8 mm.

The underlayer 3 is formed of a non-magnetic metal material mainly composed of chromium. As a practical matter, a metal material mainly composed of only chromium or chromium alloy such as CrW, CrV, CrTI, CrMo or the like may be used. The underlayer 3 is formed, for example, with a sputtering method such as magnetron sputtering or the like. As adequate film forming conditions, for example, the substrate temperature is 30° C., the Ar gas pressure is 3 to 5 m Torr, and the input power is 100 to 800 W. Moreover, it is also possible to introduce, in place of the sputtering method, other film forming methods, for example, vacuum evaporation or ion beam sputtering or the like. Film thickness of the underlayer 3 is determined within a wider range depending on various factors but the thickness is preferentially set within the range of 2 nm to 14 nm to improve S/N ratio. If the underlayer film thickness is 2 nm or less, a problem that sufficient magnetic characteristic cannot be obtained is generated, and if thickness becomes 14 nm or more, on the contrary, noise tends to be increased.

The magnetic layer 4 is formed of a Co-based alloy mainly composed of cobalt and an alloy where a non-magnetic material other than Cr is added to Co, for example, CoPt alloy and CoW alloy or the like are formed. It is preferable for the magnetic layer 4 that it is formed with a sputtering method such as magnetron sputtering or the like and for example, the substrate temperature is set to 30° C., as the adequate film forming conditions, Ar gas pressure is set to 3 to 5 m Torr and input power is set to 100 to 800 W. Moreover, other film forming methods, such as vacuum evaporation and ion beam sputtering or the like may be used in place of the sputtering method.

The protection layer 5 is composed of a discrete carbon or a composite including carbon. For example, WC, SiC, B4C, carbon including hydrogen and a diamond like carbon (DLC) that is noted in such a point as having higher hardness may be listed. It is preferable that the protection layer 6 be formed with a sputtering method such as magnetron sputtering or the like. As the preferable film forming conditions, for example, the substrate temperature is set to 30° C., Ar gas pressure is set to 3 to 5 m Torr and input power is set to 300 to 500 W. Moreover, other film forming methods such as vacuum evaporation and ion beam sputtering or the like can be substituted for the sputtering method. The thickness of the protection layer 6 is determined in a wider range depending on various factors, and the preferable thickness is in the range of 4 nm to 8 nm.

Here, it is also allowed that a lubricant film is formed on the protection layer. The lubricant film is usually composed of a fluorocarbon resin based material in the thickness of 1 mm to 2 nm.

The present invention diffuses Cr included in the underlayer 3 into the crystal grain boundary of magnetic layer 4 with the post-annealing.

Figure 2:
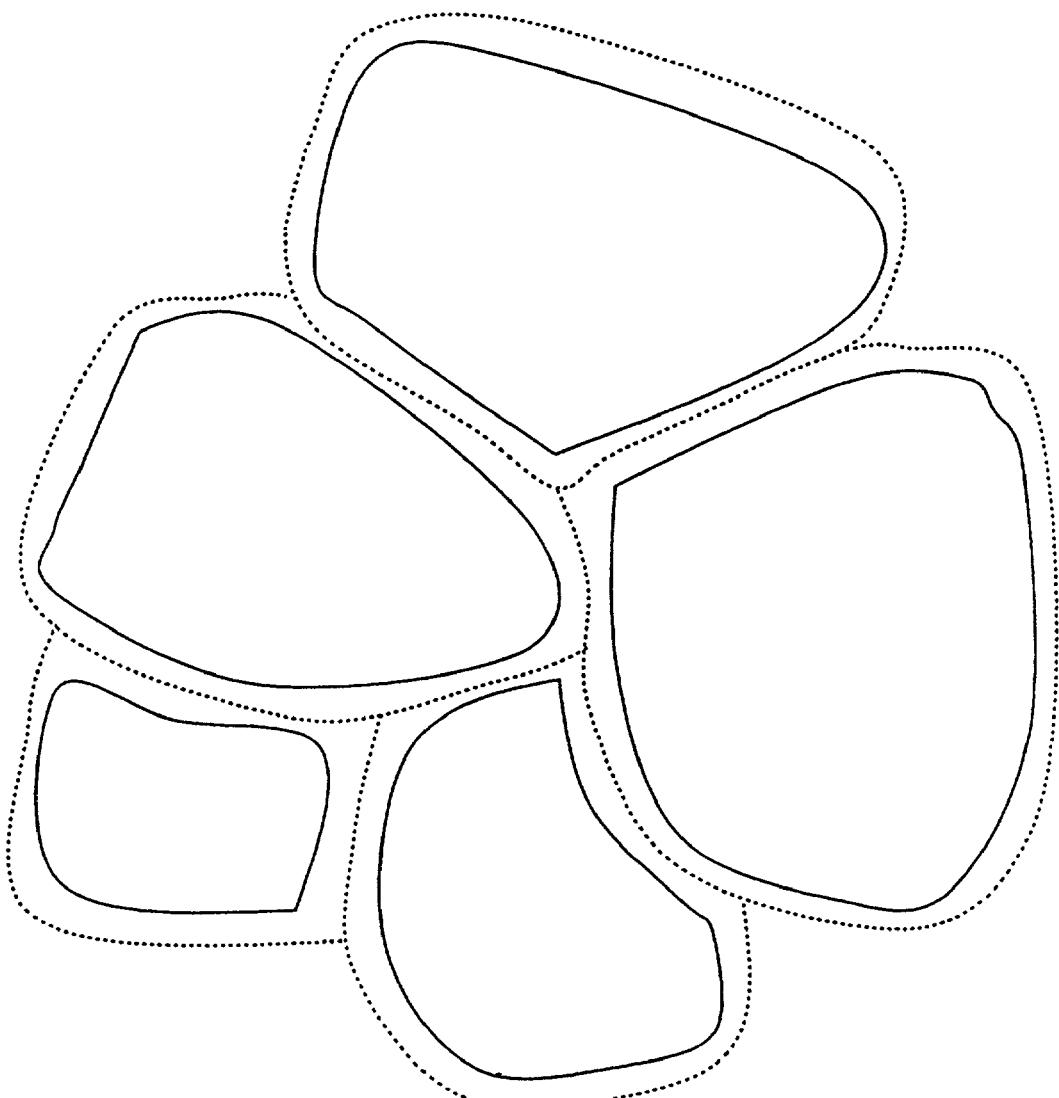
FIG. 2 is a diagram showing a crystal structure of a magnetic layer after the post-annealing.

FIG. 2 shows a crystal structure in the magnetic layer 4 of the magnetic recording medium 1 after the post-annealing.

In FIG. 2, a dotted line indicates the grain boundary, the region surrounded by a solid line is the region composed of a Co-based alloy (Cr is not included) and the region surrounded by the dotted line and solid line is the region composed of a CoCr based alloy. From FIG. 2, it is understood that Cr is segregated only to the area near the crystal grain boundary with the post-annealing. Since Cr is diffused into the crystal grain boundary of the magnetic layer 4, magnetic mutual operation among the crystal grains of magnetic layer 4 is impeded. Thereby, generation of noise in the magnetic layer 4 can be controlled.

However, when the post-annealing is executed after formation of the protection layer 5 mainly composed of carbon as explained above, carbon reaches the surface of the underlayer 3 passing through the crystal grain boundary to form a film to impede diffusion to the grain boundary of magnetic layer 4 of Cr of the underlayer 3. Therefore, it is preferable to execute the post- annealing after the magnetic layer 4 is formed and before the protection layer 5 is formed. Moreover, if the magnetic layer 4 is exposed before the protection layer 5 is formed, when the substrate 2 is exposed to the atmospheric condition under this condition, an oxide film is formed at the surface. Since this oxide film is condensed during the post-annealing to provide roughness of the surface, it is preferable that the post-annealing is conducted while the vacuum condition is maintained after lamination of the magnetic film 4.

Figure 3:
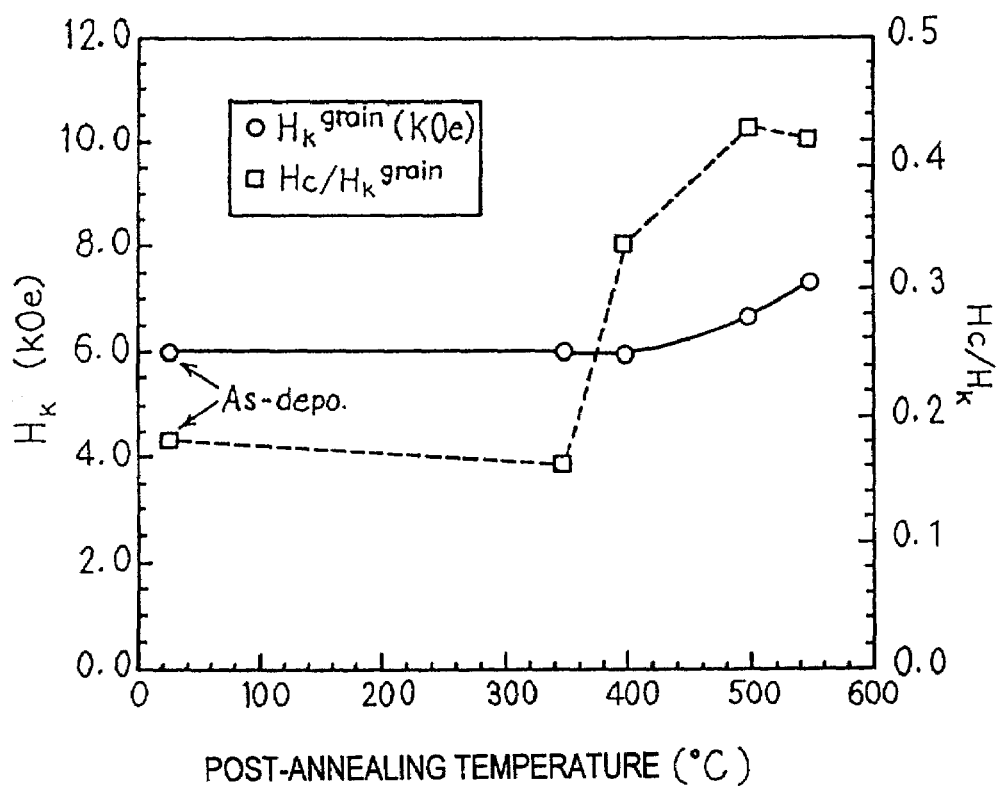
FIG. 3 is a graph showing the relationship between the post-annealing temperature and magnetization characteristic.

FIG. 3 shows the temperature dependence characteristics of a coercive force Hc in the post-annealed medium (underlayer is Cr and magnetic layer is CoPt) and the standardized coercive force Hc/Hk.

As shown in FIG. 3, diffusion of Cr to the crystal grain boundary of the magnetic layer from the underlayer is induced at temperatures higher than 350° C. Moreover, it is also understood that the Hc/Hk value can be increased, while the anisotropic magnetic field Hk does not change, by setting the post-annealing temperature to 350° C. or higher. These results indicate that the mutual operations among grains are reduced and diffusion of Cr to the crystal grain boundary of magnetic layer is accelerated. In the post-annealing temperature region exceeding 30° C., the Hc/Hk value becomes higher as the post-annealing temperature rises. Therefore, it can also be proved that segregation of Cr can be controlled depending on the post-annealing temperature.

Figure 4:
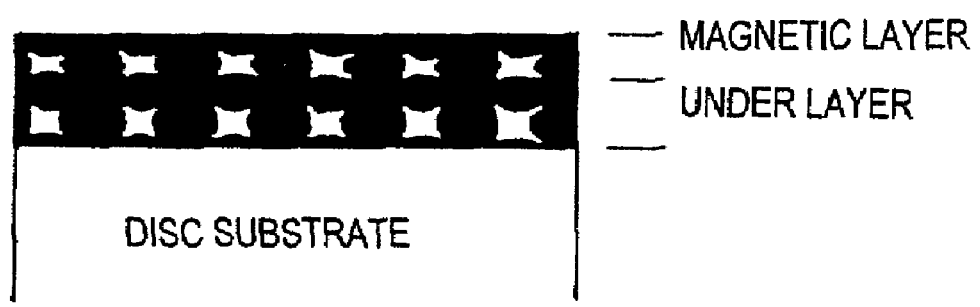
FIG. 4 is a diagram showing the growth process of magnetic grains.

FIG. 4 shows a growth process of magnetic grains of the magnetic layer. As the magnetic layer, CoCrPt is used, and as the underlayer, Cr is used.

For acceleration of segregation of Cr due to the post-annealing, it is effective to introduce a medium forming technique to laminate the underlayer and the magnetic layer with the sputtering method in place of the heat treatment of the substrate. In this technique, as shown in FIG. 4, since the forming condition in which one magnetic grain grows on one crystal grain of the underlayer is realized, the plain size of the magnetic grains can be controlled with the plain size of the crystal grains of the underlayer.

Figure 5A:
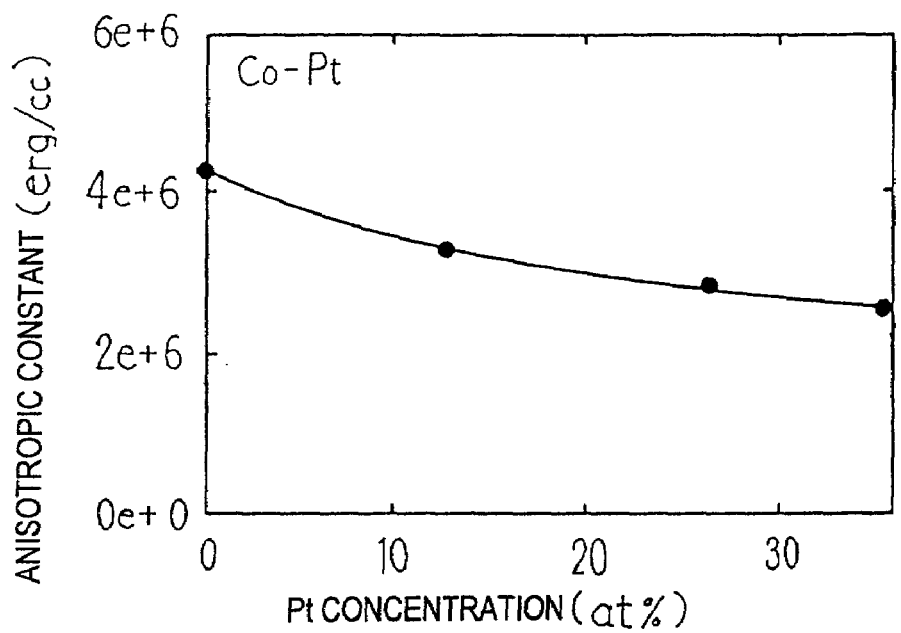
FIGS. 5(*a*) and 5(*b*) are graphs showing the relationships between concentrations of additives of Co-based alloy and Ku values.
Figure 5B:
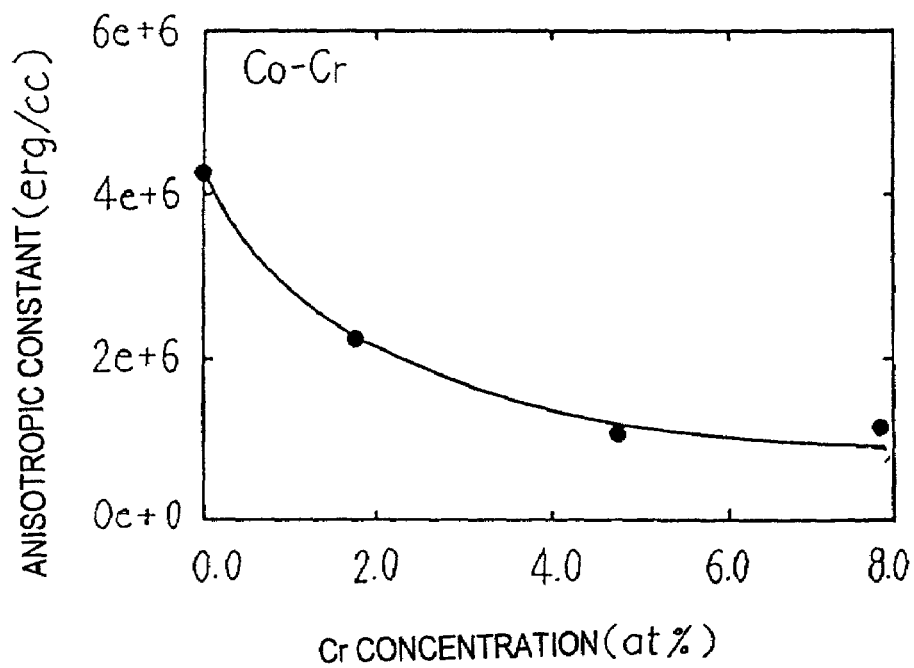

FIGS. 5(a) and 5(b) show graphs indicating the relationship between the concentration of additives and anisotropic constant Ku in the Co based magnetic material. FIG. 5(a) is a graph where Pt is added as the additive, while FIG. 5(b) is a graph where Cr is added as the additive. From FIG. 5(a) and 5(b), it can be understood that when the concentration of the additive becomes higher, Ku becomes lower than 4e+6(erg/cc), which is the Ku value of discrete element of Co. However, a lowering degree in the case where Cr is added as the additive becomes larger than that in the case where Pt is added, and a higher reduction degree is indicated in the region where Cr concentration is 5 at % or less. Therefore, if the CoCr based alloy is used for the magnetic layer, it is preferable to set the Cr concentration to 5 at % or less, if possible, to 3 at % or less where the Ku value which is higher than the half of Ku value of discrete element of Co can be obtained.

Figure 6:
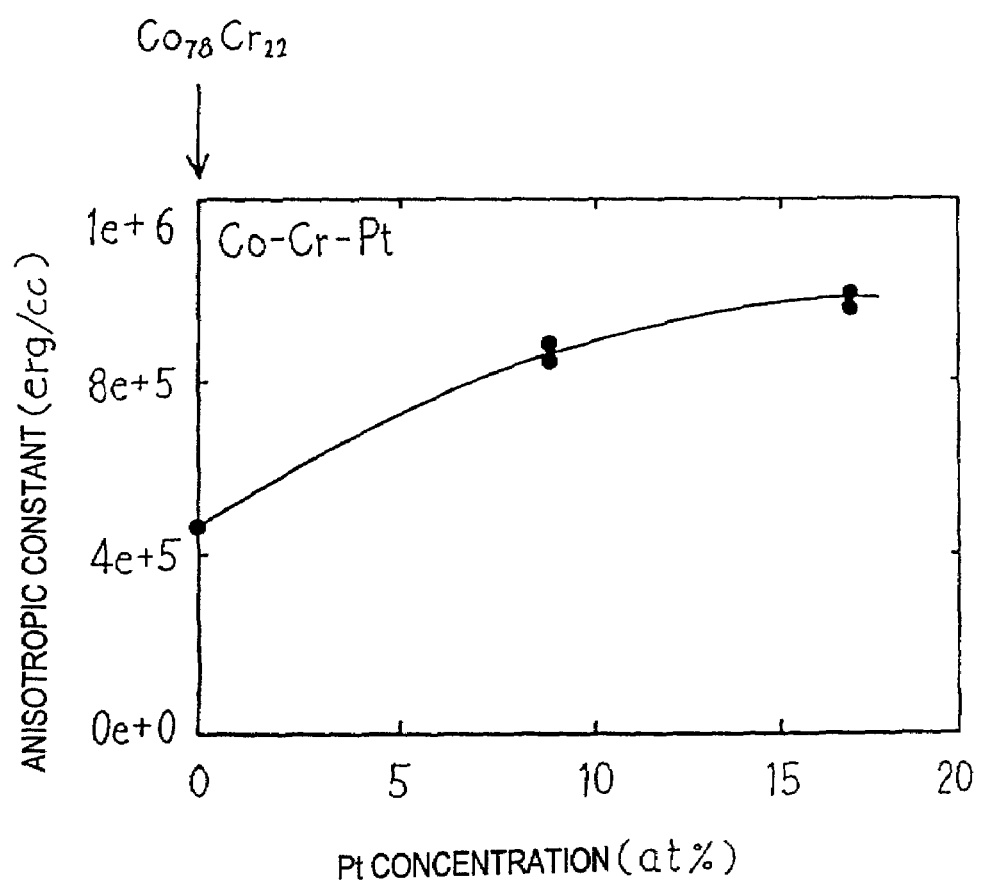
FIG. 6 is a graph showing the relationship between Cr concentration in CoCrPt and Ku value.

FIG. 6 is a graph indicating the relationship between the Cr to Pt ratio in CoCrPt (concentration of Co has the constant value of 78%) and the Ku value. From FIG. 6, it can be understood that the Ku value is lowered when a rate of Pt is decreased and a rate of Cr is increased. When the rate of Pt is 0 and additional coefficient of Cr is 22%, which is the practical adding coefficient, Ku becomes 4e+5(erg/cc) which is about 1/10 of the Ku value of discrete element of Co.

Figure 7:
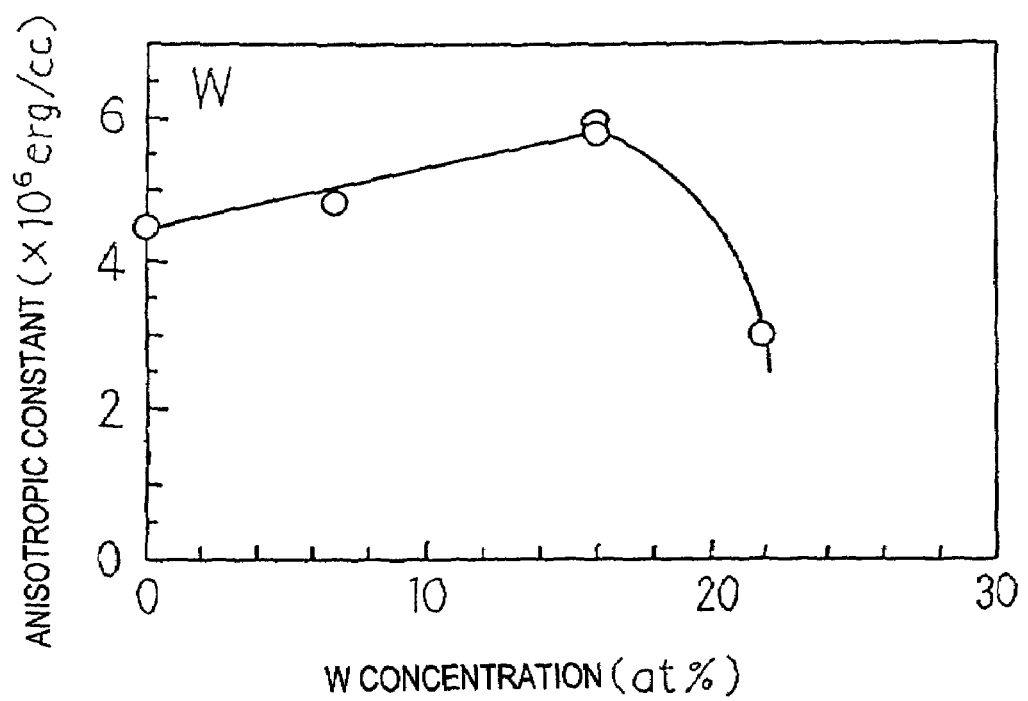
FIG. 7 is a graph showing the relationship between W concentration in CoW and Ku value.

FIG. 7 is a graph showing the relationship between the adding coefficient of W in CoW and the Ku value. From FIG. 7, it can be understood that while the adding coefficient of W is in the range of 0 to 16 at % and when the adding coefficient of W is increasing, the value of Ku becomes larger, but when the adding coefficient of W exceeds 16 at %, the Ku value rapidly decreases. However, in CoCr, a Ku value higher than that in addition of Cr in the same concentration can be obtained. From FIG. 7, it can be seen that the concentration of W should preferably be 16 at % or less when CoW is used for the magnetic layer.

As explained above, from the graphs of FIG. 5 to FIG. 7, it can be understood that the addition of Cr remarkably reduces the Ku value, and that reduction of the Ku value can be reduced or increased by adding Pt and W in place of Cr. When the discrete element of Co is used as the magnetic layer, a higher Ku value can be obtained as shown in FIGS. 5(a) and 5(b), but simultaneously corrosion proof characteristic is deteriorated. Accordingly, it is required to enhance passivation but it is inferior for practical use. Moreover, when the magnetic material not including Cr is used, a problem is generated in which the grain boundary region cannot be non-magnetized. But, this problem can be solved by inducing diffusion of Cr into the crystal grain boundary of the magnetic layer from the underlayer with post-annealing, as explained above.

Figure 8:
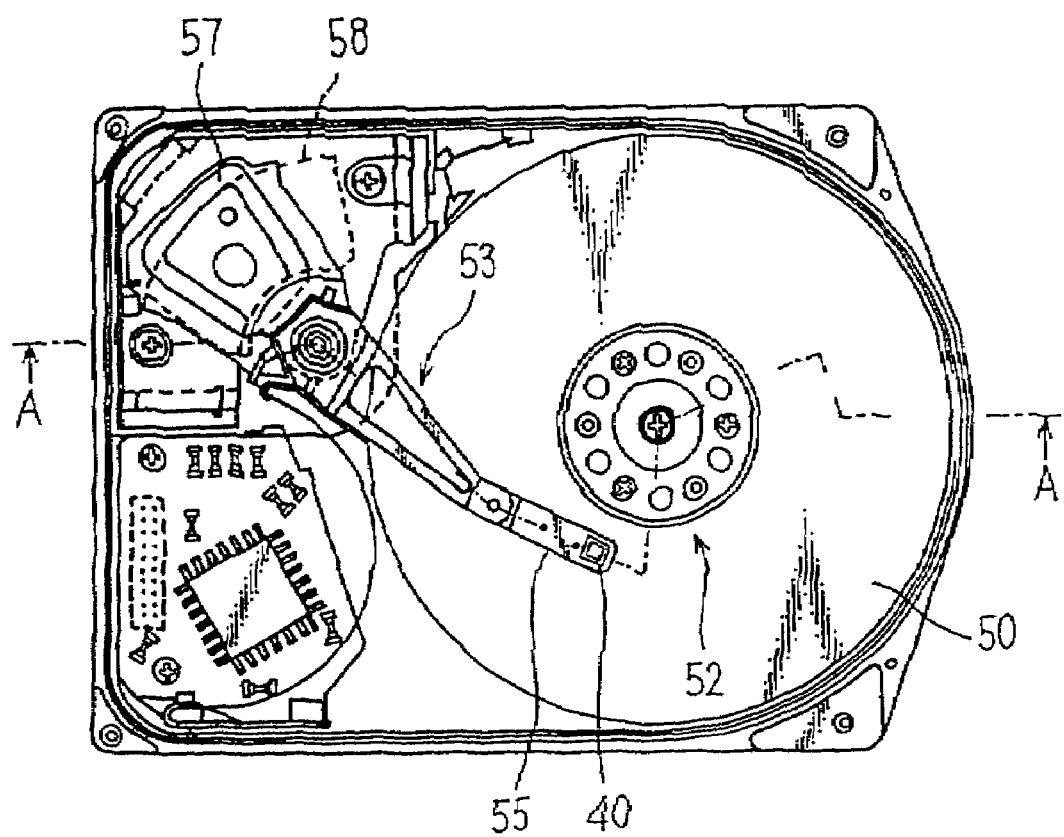
FIG. 8 is a plan view of the magnetic disc drive as an embodiment of the present invention.
Figure 9:
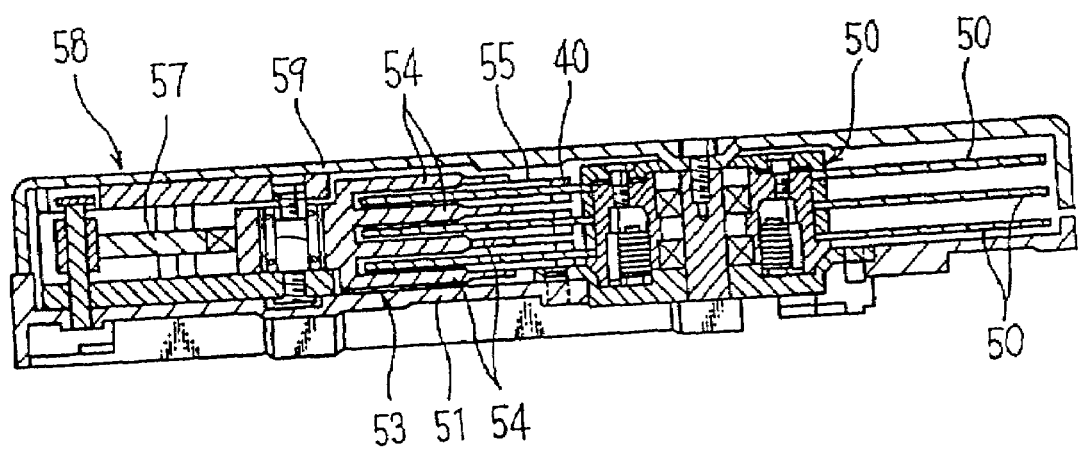
FIG. 9 is a cross-sectional view of the magnetic disc drive of FIG. 8 as an embodiment of the present invention.

On the other hand, the present invention is also applied to the magnetic disc drive including the magnetic recording medium explained above, and an example of the magnetic disc drive is shown in FIG. 8 and FIG. 9. FIG. 8 is a plan view of the magnetic disc drive of the present invention under the condition that a cover is removed, while FIG. 9 is a cross-sectional view along the line A-A of FIG. 8.

In these figures, numeral 50 designates a magnetic disc driven with a spindle motor 52 provided on a base plate 51. In this embodiment, three magnetic discs are provided.

Numeral 53 is an actuator supported to rotate on the base plate 51. One end of the actuator 53 is provided with a plurality of head arms 54 extending in the direction parallel to the recording surface of the magnetic disc 50. One end of the head arm is provided with a spring arm. A slider 40 is mounted to the flexure part of spring arm 55 via an insulation film (not shown). The other end of actuator 53 is provided with a coil 57.

On the base plate 51, a magnetic circuit 58 formed of a permanent magnet and a yoke is provided and the coil 57 explained above is allocated within a magnetic gap of the magnetic circuit 58. A voice coil motor (VCM) is structured with the magnetic circuit 58 and coil 57. Moreover, the upper part of base plate 51 is covered with a cover 59.

Operations of the magnetic disc drive explained above will now be explained. While the magnetic disc 50 does not rotate, the slider 40 is in the stationary condition in contact with the saving zone of the magnetic disc 50. Next, when the magnetic disc drive 50 is rotated by the spindle motor 52, the slider 40 is levitated from the disc surface, keeping a small gap with the air flow generated with rotation of the magnetic disc 50. When a current flows into the coil 57 while the slider is levitated, a propulsive force is generated in the coil 57 to rotate the actuator 53. The slider 40 moves to the position on the predetermined track of the magnetic disc 50 to read or write data from or to the disc.

Figure 10:
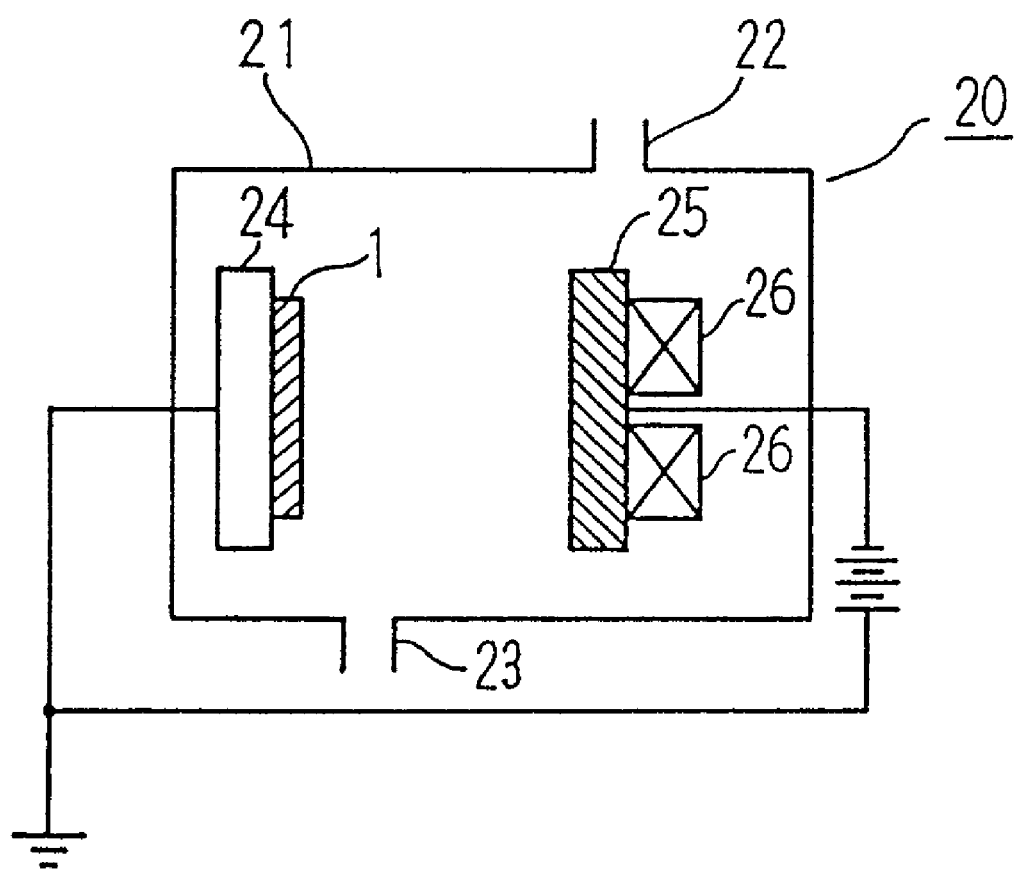
FIG. 10 is a diagram showing a structure of a sputtering apparatus.

In the present invention, a DC magnetron sputtering apparatus 10 as shown in FIG. 10 is used to form the predetermined film on the substrate. The sputtering apparatus 20 is provided, as shown in the figure, with a gas supply port 22 for guiding the gas into the sputtering chamber 21, an exhaust port 23, a susceptor 24 for supporting a disc substrate, a target 25 and a magnet 26.

In view of verifying the effect of use of the magnetic layer not including Cr and the effect of non-heating of the substrate in the laminating process, three kinds of media indicated below are manufactured on trial to measure the respective magnetic characteristics.

Figure 11:
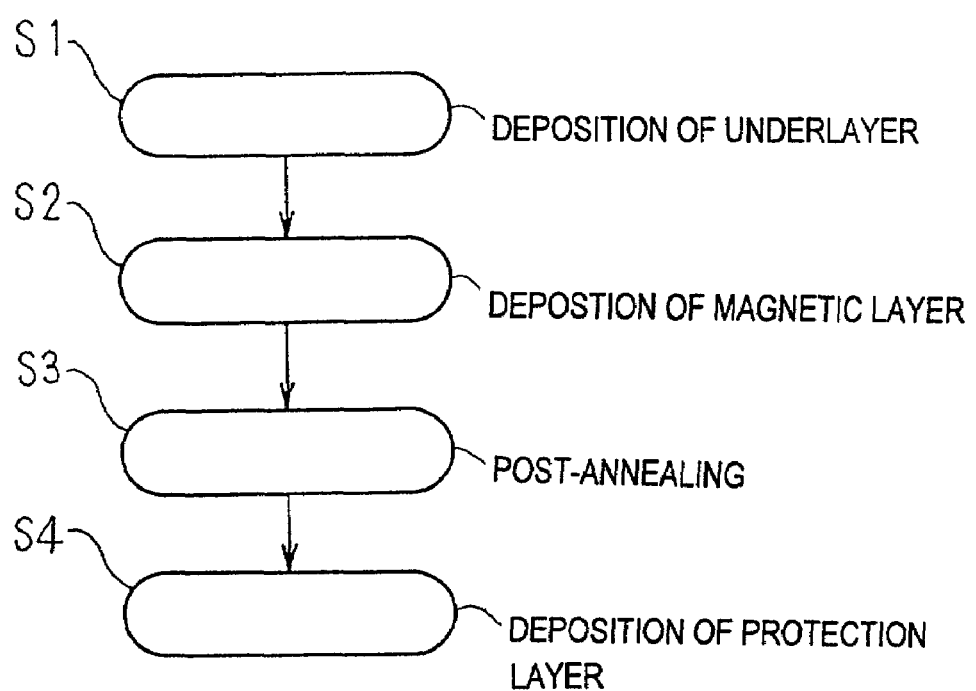
FIG. 11 is a flowchart of the process to form a medium in an embodiment of the present invention.

1. Medium A:

As shown in FIG. 1, the cross-section of the medium A is formed of an underlayer 3, a magnetic layer 4 and a protection layer 5 laminated sequentially on a substrate 2. The manufacturing process of medium A is shown in FIG. 11. The manufacturing process of medium A will be explained with reference to FIG. 11. S1: An underlayer 3 is laminated on a substrate 2 consisting of a Si disc with an external diameter of 6.5 mm, an internal diameter of 20 mm and a thickness of 0.635 mm on which surface a silicon oxide film is formed in the thickness of 300 nm. The underlayer 3 is composed of a polycrystalline film of Cr. After the chamber of the sputtering apparatus is evacuated to 5e-10 Torr, a film is formed in the thickness of 5 nm on the substrate 2 under the condition that the Ar gas pressure in the sputtering chamber is set to 3 m Torr. S2: A magnetic layer 4 is laminated on the underlayer 3. The magnetic layer 4 is formed of a CoPt alloy polycrystalline film, and this film is formed in the thickness of 14 nm on the underlayer 3 under the conditions that the Ar gas pressure in the sputtering chamber is set to 3 m Torr and the input power is set to 100 W. The magnetic layer 4 of medium A has the composition of cobalt of 88 at % and platinum of 12 at %.

On the occasion of forming a film of magnetic layer 4, a bias voltage is set to 0V in order to avoid the heat processing of the substrate. Moreover, in order to attain high purity of film, a partial pressure of oxidized gas element is reduced to 1e-11 Torr or less by reducing the vacuum base pressure (1e-9 Torr) and purifying the Ar gas.

S3: After the magnetic layer 4 is formed, the vacuum condition is held and the post-annealing is performed for 20 seconds at 450° C. to sufficiently induce the diffusion of Cr to the magnetic layer 4 from the underlayer 3.

S4: A protection layer 5 is laminated on the magnetic layer 4. The protection layer 5 is formed after the post-annealing. This layer 5 is formed in the thickness of 5 nm on the magnetic layer 4 under the conditions that the substrate temperature is 30° C., the Ar gas pressure in the sputtering chamber is set to 3 m Torr and the input power is set to 1000 W.

From the medium A manufactured as explained above, a value of Ku of 3.7 e+6(erg/cc) and a value of Hc/Hk of 0.44 have been obtained. The Ku value obtained here is larger than 8e+5(erg/cc), which is the value of Ku of the medium of which the magnetic layer is composed of Co66Cr22Pt12. Moreover, as the value of Hc/Hk, 0.44 has been obtained by reflecting the width of the non-magnetized region of the grain boundary portion formed with diffusion of Cr into the grain boundary of magnetic layer. From this result, it has been proved that sufficient grain boundary segregation of Cr can be realized even in the medium where Cr is not added to the magnetic layer. Here, it has also been confirmed that Cr exists only in the region within 3 nm from the crystal grain boundary in the magnetic layer 4.

Figure 12:
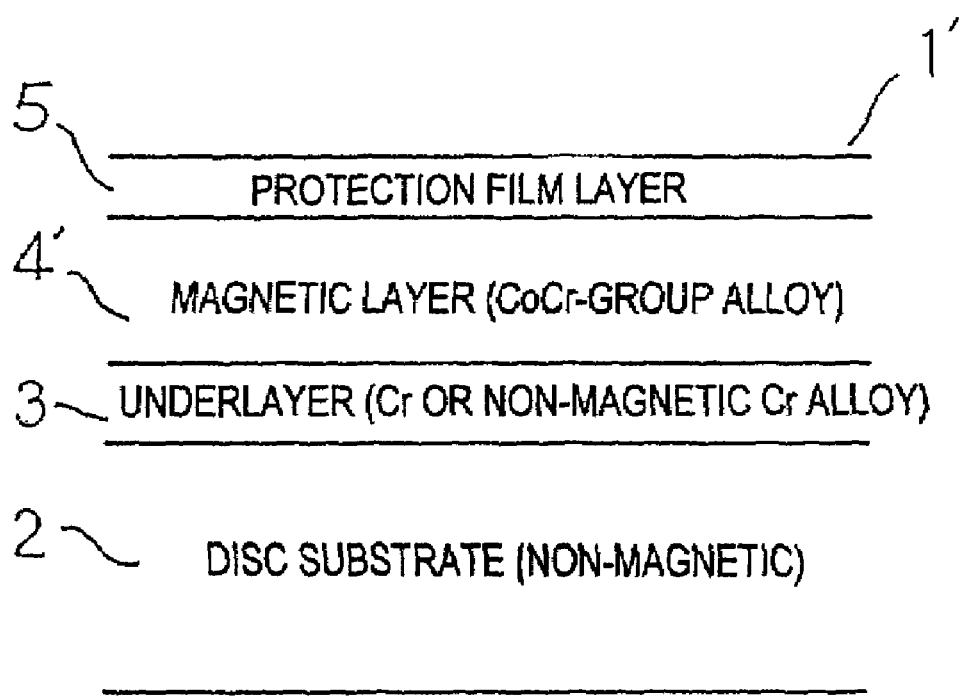
FIG. 12 is a cross-sectional view of an existing medium.
Figure 13:
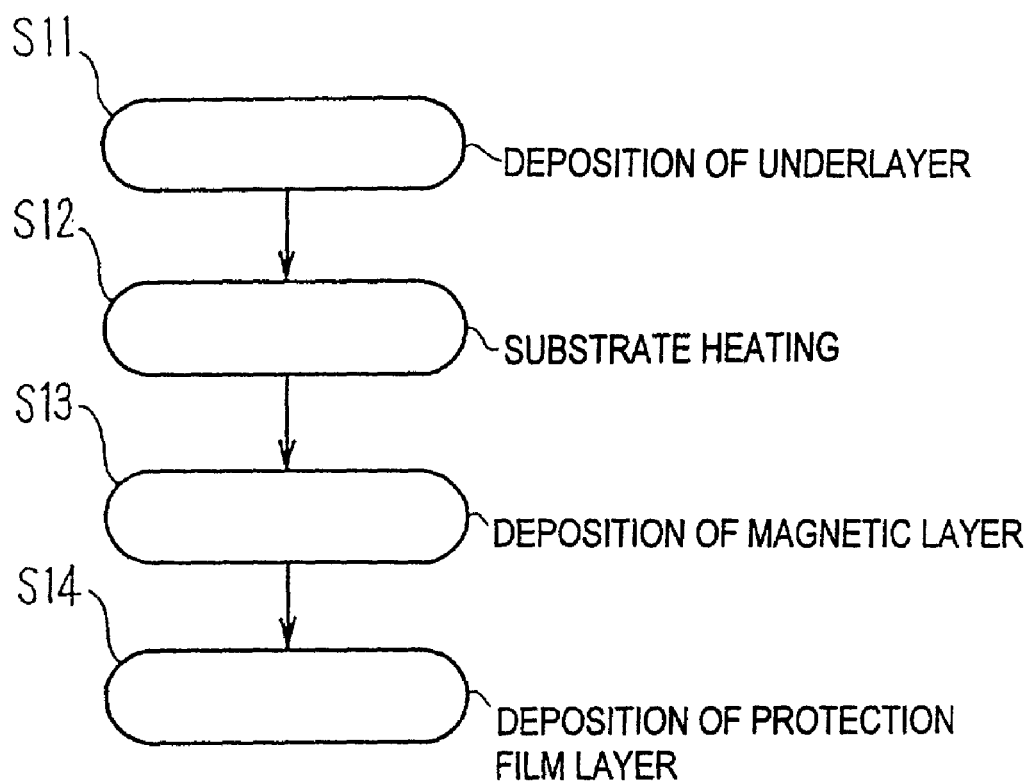
FIG. 13 is a flowchart of the process to form an existing medium.

2. Medium B:

A structure of the layer of medium B is shown in FIG. 12. Unlike medium A, medium B has a magnetic layer 4' including Cr. The manufacturing process of medium B is shown in FIG. 13. The manufacturing process of medium B will be explained with reference to FIG. 13.

S11: An underlayer 3 is laminated on a substrate 2. The shape and material of the substrate 2 are identical to that of medium A. The underlayer 3 is composed of the polycrystalline film of Cr and it is formed in the thickness of 5 nm on the substrate under the conditions that the sputtering chamber is evacuated to 5e-Torr, the Ar gas pressure in the sputtering chamber is set to 3 m Torr and the input power is set to 100 W.

S12: The substrate 2 is heated up to 250° C.

S13: A magnetic layer 4 is formed on the underlayer 3. The magnetic layer 4' is composed of the CoCr group alloy magnetic material and it is formed on the underlayer 3 in the thickness of 14 nm under the condition that the substrate 2 is heated, the Ar gas pressure in the sputtering chamber is set to 3 m Torr and the input power is set to 100W. The composition of magnetic layer 4' of medium A has the composition of cobalt of 75 at % and chromium of 13 at %.

S14: A protection layer 5 is also formed on the magnetic layer 4'. The protection layer 5 is formed in the thickness of 5 mm on the magnetic layer 4' under the conditions that the substrate temperature is set to 30° C., the Ar gas pressure in the sputtering chamber is set to 3 m Torr and the input power is set to 1 kW.

In medium B manufactured as explained above, since Cr is added to the magnetic layer 4', the Hc/Hk value of 0.3 has been obtained because the grain boundary region can be non-magnetized by segregating Cr included in the magnetic grains into the grain boundary on the occasion of deposition. However, the Ku value obtained has only been 7e+6(erg/cc).

3. Medium C:

The shape of the cross-section of medium C is identical to that of medium A and is shown in FIG. 1. Moreover, the manufacturing process is as shown in FIG. 11, which is identical to the process of medium A. The only difference from the manufacturing process of medium A is that the substrate is heated up to 250° C. when the magnetic film 4 is formed with the sputtering method.

From medium C manufactured as explained above, the Ku value of 3.7e+6(erg/cc) has been obtained as in the case of medium A. However, diffusion of Cr into the grain boundary of the magnetic layer does not occur, and the Hc/Hk value has been reduced to 0.1 or less.

From the values of Ku and Hc/Hk of each medium manufactured as explained above, it can be understood that a comparatively larger Ku value can be obtained in media A and C where Cr is not added to the magnetic layer, and moreover a large Hc/Hk value has been obtained in medium A where the substrate is not heated when the magnetic layer is formed. From this result, it has also been confirmed that Cr should not be added to the magnetic layer to obtain a large Ku value, while the sputtering process should be conducted without heating the substrate in order to obtain a large Hc/Hk value.

In the present invention, since the Co based alloy in which Cr is not added is used as a material of the magnetic layer, the Ku value is maintained at higher value. Since the Ku value is high, the volume of crystal grains for starting deterioration of magnetic characteristic due to the thermal disturbance becomes small, and thereby reduction in the thickness of the magnetic film can be accelerated. As a result, an area of one bit can be reduced, and thereby high recording density can be achieved. Moreover, since the Cr-based alloy is used as the material of the underlayer, Cr can be diffused into the grain boundary of the magnetic layer from the underlayer. Since Cr is diffused into the grain boundary, the grain boundary of the magnetic layer can be non-magnetized. As a result, the magnetic mutual operation among grains can be controlled, and the noise of the magnetic recording medium can also be reduced.

As explained above, in the present invention, reduction in thickness of the magnetic layer and noise can be accelerated, and thereby high recording density of magnetic recording medium can be realized.

What is claimed is:

1. A method of manufacturing a magnetic recording medium comprising the steps of:

laminating an underlayer above a substrate, said underlayer consisting of a Cr-based non-magnetic material;

laminating, above the underlayer, a magnetic layer consisting of an alloy of Co and a non-magnetic material, where said non-magnetic material of said magnetic layer consists of a material other than Cr and includes at least one material selected from the group consisting of W and Pt; and post-annealing, after said magnetic layer and said underlayer have been laminated, to diffuse Cr from said underlayer into said magnetic layer such that Cr is present only at the crystal grain boundaries of said alloy, wherein said magnetic layer is laminated with the sputtering method under the condition of the bias voltage being set to 0 V.

2. A magnetic recording medium comprising:

an underlayer laminated on a substrate and including a Cr-based non-magnetic material; and a magnetic layer consisting of a CoCr-based alloy including Cr in the concentration of less than 5 at %, wherein Cr is present only at the crystal grain boundaries of said CoCr-based alloy.

* * * * *

UNITED STATES PATENT AND TRADEMARK OFFICE
CERTIFICATE OF CORRECTION

PATENT NO. : 7,270,897 B2  
APPLICATION NO. : 10/008713  
DATED : September 18, 2007  
INVENTOR(S) : Mukai Page 1 of 1

It is certified that error appears in the above-identified patent and that said Letters Patent is hereby corrected as shown below:

<u>Title Page item 57 In the Abstract</u>:

In line 6 of the Abstract, delete "opf" and insert --of--.

Signed and Sealed this

Tenth Day of June, 2008

JON W. DUDAS  
*Director of the United States Patent and Trademark Office*